(12) United States Patent
Juang

(10) Patent No.: US 9,013,285 B2
(45) Date of Patent: Apr. 21, 2015

(54) ELECTRONIC DEVICE AND METHOD FOR DISPLAYING WARNING SIGNALS OF BICYCLE

(71) Applicant: Chi Mei Communication Systems, Inc., New Taipei (TW)

(72) Inventor: Heng-Yi Juang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 42 days.

(21) Appl. No.: 13/778,924

(22) Filed: Feb. 27, 2013

(65) Prior Publication Data

US 2013/0285802 A1    Oct. 31, 2013

(30) Foreign Application Priority Data

Apr. 27, 2012    (TW) .............................. 101115291 A

(51) Int. Cl.
*B62J 3/00*    (2006.01)
*B60Q 1/26*    (2006.01)

(52) U.S. Cl.
CPC *B62J 3/00* (2013.01); *B60Q 1/2673* (2013.01)

(58) Field of Classification Search
USPC .......................... 340/427, 432, 465, 475, 479
See application file for complete search history.

(56) References Cited

U.S. PATENT DOCUMENTS

| | | | |
|---|---|---|---|
| 7,800,485 B2 * | 9/2010 | Russell | 340/432 |
| 8,269,619 B2 * | 9/2012 | Lee | 340/475 |
| 8,629,766 B2 * | 1/2014 | Lee | 340/432 |
| 2007/0063831 A1 * | 3/2007 | Perkins et al. | 340/479 |
| 2010/0251453 A1 * | 10/2010 | Chen | 2/69 |
| 2010/0309009 A1 * | 12/2010 | Lee et al. | 340/665 |
| 2013/0033370 A1 * | 2/2013 | Langlois | 340/432 |

* cited by examiner

*Primary Examiner* — Brent Swarthout
(74) *Attorney, Agent, or Firm* — Novak Druce Connolly Bove & Quigg LLP

(57) ABSTRACT

In a method for displaying warning signals using an electronic device while riding a bicycle, the method firstly detects any acceleration of the electronic device in three predefined axes in real time using a gravity sensor of the electronic device, and detects any angular velocity of the electronic device around any of the three predefined axes using a gyroscope of the electronic device. Secondly, the method determines a current driving condition of the bicycle according to any detected acceleration and any detected angular velocity of the electronic device. The method displays warning signals on the display screen of the electronic device according to the current driving condition of the bicycle.

10 Claims, 4 Drawing Sheets

(a)

(b)

(c)

ELECTRONIC DEVICE AND METHOD FOR DISPLAYING WARNING SIGNALS OF BICYCLE

BACKGROUND

1. Technical Field

The embodiments of the present disclosure relate to warning systems and methods, and more particularly to an electronic device and method for displaying warning signals in relation to a bicycle.

2. Description of Related Art

Bicycles are popular as a means of transport. However, the bicycles do not include warnings to other road users such as brake lights or turn signals. A bicycle is vulnerable and it is dangerous for cyclists if there are no any warning device on the bicycles to display warning signals to other traffic when the bicycle brakes and turns.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 1:
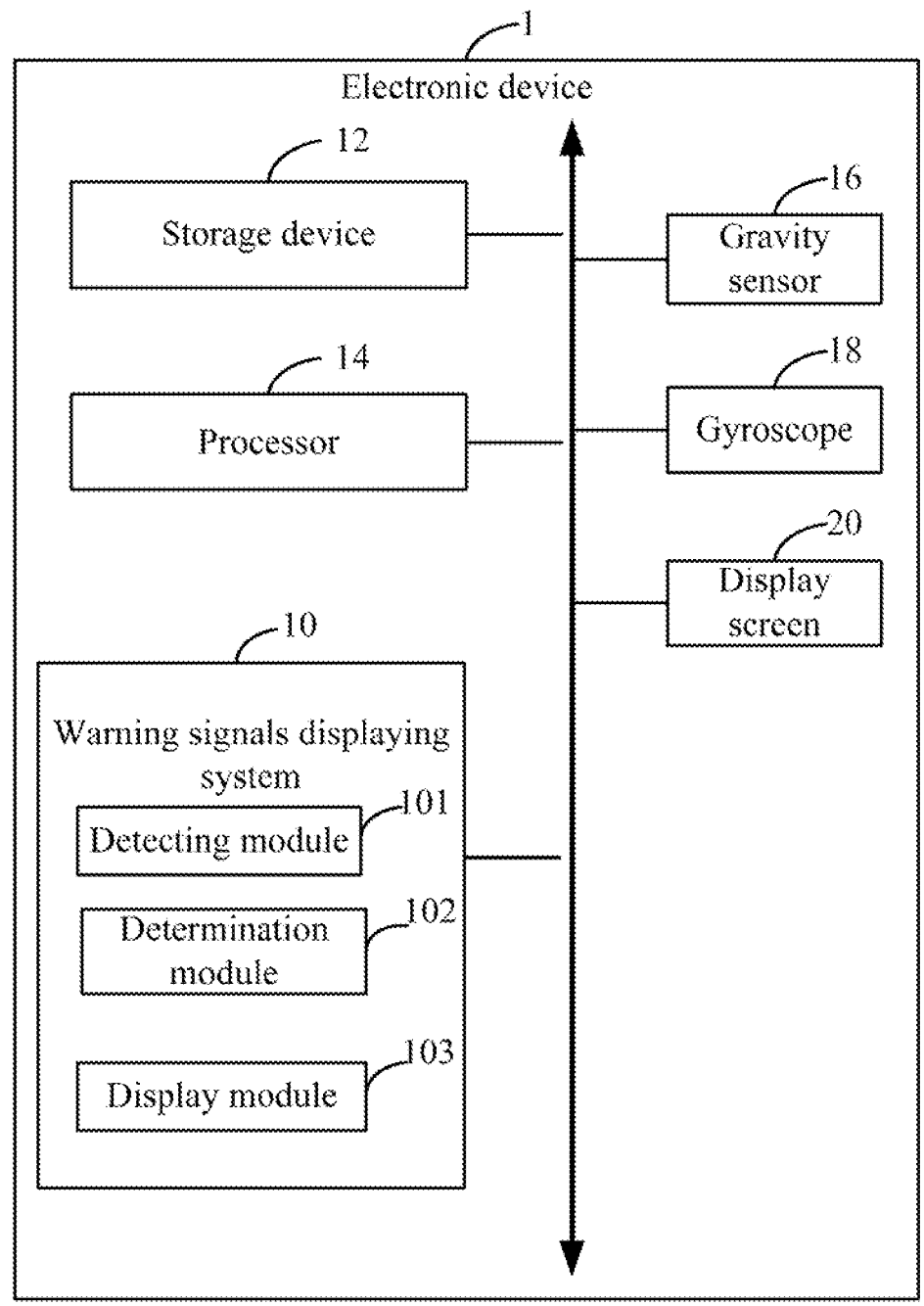
FIG. 1 is a block diagram of one embodiment of an electronic device including a warning signals display system.

FIG. 1 is a block diagram of one embodiment of an electronic device 1 including a warning signals displaying system 10. In the embodiment, the electronic device 1 may further comprise a portable electronic device containing a storage device 12, at least one processor 14, a gravity sensor 16, a gyroscope 18, and a display screen 20. The portable electronic device 1 may be a smart phone, a PDA device, or a tablet computer, for example. The portable electronic device comprises a rigid casing 5 and the components of the portable electronic device, such as the storage device 12, the at least one processor 14, the gravity sensor 16, the gyroscope 18, and the display screen 20 are contained within the rigid casing.

Figure 2:
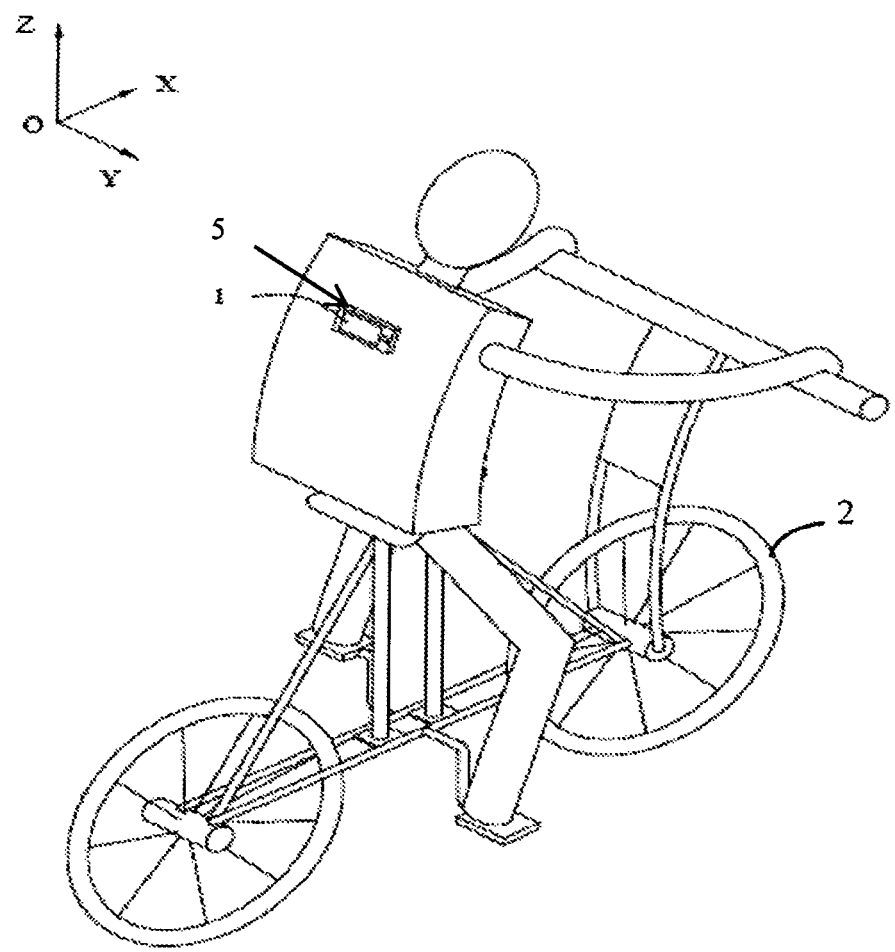
FIG. 2 is one exemplary of warning signals being displayed while the bicycle is being ridden.

Referring to FIG. 2, the electronic device 1 may be carried on a back of a cyclist of a bicycle 2, so that the display screen 20 displays warning signals clearly to other traffic around the bicycle 2.

In one embodiment, the storage device 12 (non-transitory storage device) may be an internal storage system, such as a random access memory (RAM) for the temporary storage of information, and/or a read only memory (ROM) for the permanent storage of information. In some embodiments, the storage device 12 may be an external storage system, such as an external hard disk, a storage card, or a data storage medium.

The at least one processor 14 may include a processor unit, a microprocessor, an application-specific integrated circuit, and a field programmable gate array, for example.

The gravity sensor 16 detects acceleration of the electronic device 1 along three predefined axes in real time. The three predefined axes are represented by the Z-axis in the direction of gravity, by the X-axis perpendicular to the display screen 20 of the electronic device 1, and by the Y-axis perpendicular to both the Z-axis and the X-axis.

The gyroscope 18 detects angular velocity of the electronic device 1 along the three predefined axes.

Figure 3:
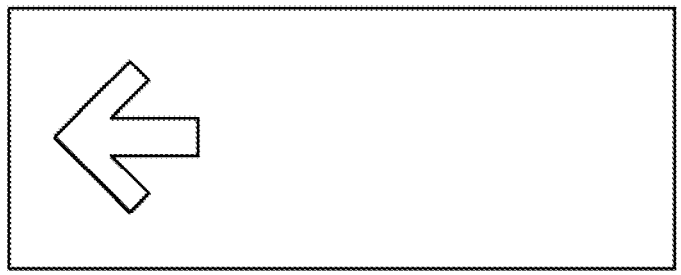
FIG. 3 shows different warning signals being given while driving a bicycle.
Figure 3:
Figure 3:
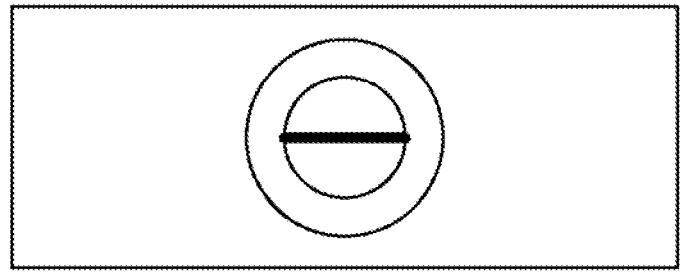

The display screen 20 may be an LED device or an LCD screen, and displays warning signals according to a driving condition of the bicycle 2, where the driving condition may be a turning or a braking of the bicycle 2, for example. As shown in FIG. 3, if the bicycle 2 turns to the left, the warning signal is a left arrow; if the bicycle turns to the right, the warning signal is a right arrow; and if the bicycle 2 brakes, the warning signal is a flashing circle; if the bicycle 2 returns to a single vector and a uniform speed, all of the display on the display screen 20 is cleared.

In one embodiment, the warning signals displaying system 10 includes a plurality of function modules which include computerized codes or instructions that can be stored in the storage device 12 and executed by the at least one processor 14 to provide a method for sending a warning signal.

In one embodiment, the warning signals displaying system 10 may include a detecting module 100, a determination module 102, and a display module 104. The modules may comprise computerized codes in the form of one or more programs that are stored in the storage device 12 and executed by the at least one processor 14 to provide functions for implementing the modules. The functions of the function modules 100-104 are illustrated in FIG. 4 and described below.

Figure 4:
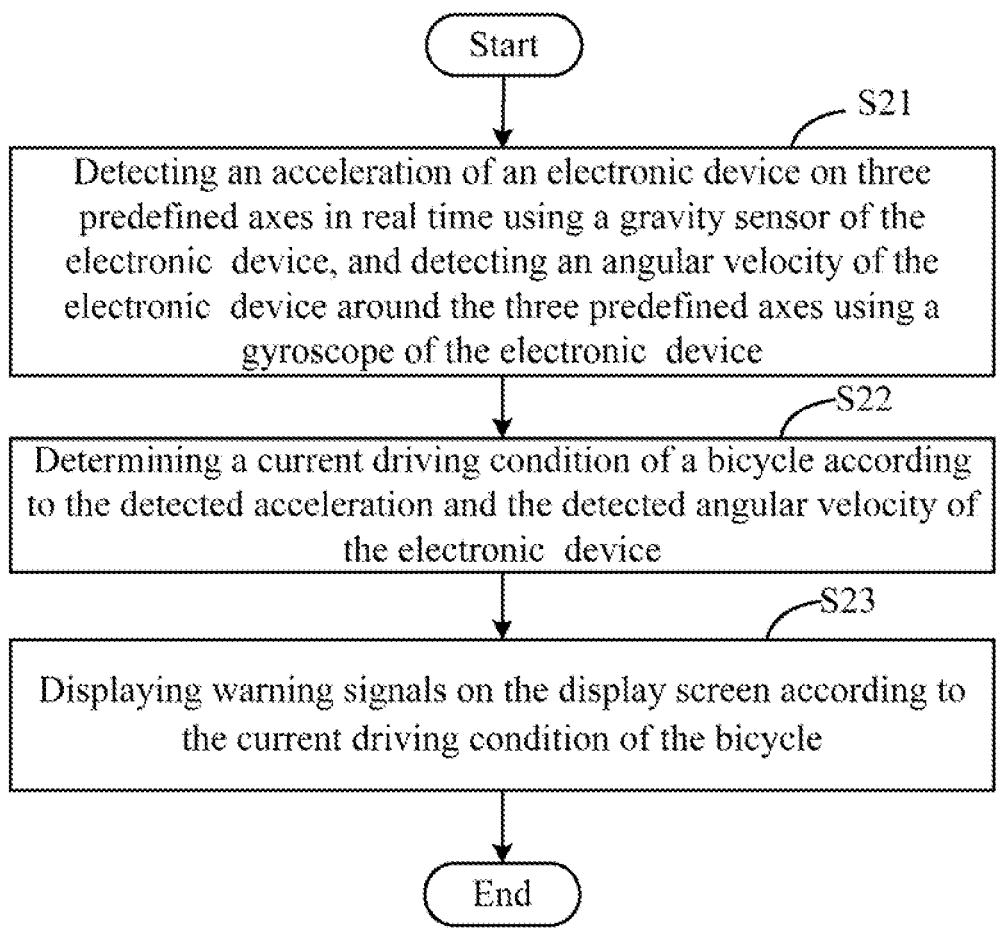
FIG. 4 is a flowchart of one embodiment of a method for a bicycle displaying warning signals.

FIG. 4 illustrates a flowchart of one embodiment of a method for displaying warning signals using the electronic device 1. Depending on the embodiment, additional steps may be added, others removed, and the ordering of the steps may be changed.

In block S21, the detecting module 100 detects an acceleration of the electronic device 1 along the three predefined axes in real time using the gravity sensor 16, and detects an angular velocity of the electronic device 1 along the three predefined axes using the gyroscope 18. In the embodiment, the three predefined axes may be represented by the Z-axis in the direction of gravity, by the X-axis perpendicular to the display screen 20 of the electronic device 1, and by the Y-axis perpendicular to both the Z-axis and the X-axis.

In block S22, the determination module 102 determines the current driving condition of the bicycle 2 according to detected acceleration and the detected angular velocity of the electronic device 1. In the embodiment, the driving condition may be whether the electronic device 1 is accelerating or at a uniform speed, or whether the electronic device is turning to the left or turning to the right, or whether the electronic device is slowing down sharply because the bicycle is braking.

In one exemplary embodiment of FIG. 3, if the acceleration of the electronic device 1 is zero, or if the acceleration of the electronic device 1 is in a positive direction along the X-axis, it indicates that the bicycle 2 is being ridden at an accelerating or a uniform speed. If the acceleration of the electronic device 1 turns to a negative direction along the X-axis within a predefined short time period, it indicates that the bicycle 2 is braking. From above the cyclist, if the angular velocity of the electronic device 1 around the Z-axis is in a counter-clockwise direction, and the value of the angular velocity reaches a predefined threshold value, it indicates that the bicycle 2 is turning to the left. If the angular velocity of the electronic device 1 around the Z-axis is in a clockwise direction, and the value of the angular velocity reaches the above predefined threshold, it indicates that the bicycle 2 is turning to the right.

In the embodiment, from above the cyclist, if the angular velocity of the electronic device 1 in the counter clockwise direction around the Z-axis reaches the predefined threshold value, and an angle through which the electronic device 1 rotates around the Z-axis is less than a first predefined value but more than a second predefined value, it indicates that the acceleration of the electronic device 1 is in the positive direction of the X-axis and thus that the bicycle 2 is turning to the left. Again from above, if the angular velocity of the electronic device 1 in the counter clockwise direction around the Z-axis reaches the predefined threshold value, and an angle through which the electronic device 1 rotates around the Z-axis is less than the first predefined value but more than the second predefined value, it indicates that the acceleration of the electronic device 1 is in the negative direction of the X-axis and thus that the bicycle 2 is turning to the right.

In block S23, the display module 104 displays warning signals on the display screen 20 according to the current driving condition of the bicycle 2. In the embodiment, if the bicycle 2 turns to the left, the warning signal is a left arrow; if the bicycle 2 turns to the right, the warning signal is a right arrow; if the bicycle brakes, the warning signal is a flashing circle; if the bicycle returns to a single movement vector or a uniform speed, all of the display on the display screen 20 is cleared.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device for displaying warning signals of a bicycle, the portable electronic device comprising:
    a gravity sensor;
    a gyroscope;
    a display screen;
    a detecting module that detects an acceleration of the portable electronic device along three predefined axes in real time using the gravity sensor, and detects an angular velocity of the electronic device along the three predefined axes using the gyroscope, wherein the portable electronic device is carried by the bicycle;
    a determination module that determines a current driving condition of the bicycle according to the detected acceleration and the detected angular velocity of the portable electronic device; and
    a display module that displays warning signals of the bicycle on the display screen according to the current driving condition of the bicycle;
    wherein the portable electronic device comprises: a smart phone, a PDA, or a tablet computer;
    wherein the smart phone, PDA, or tablet computer comprises a rigid casing and the components of the portable electronic device, including the display screen, are contained within the rigid casing;
    wherein the smart phone, PDA, or tablet computer is configured to be carried on the back of a bicyclist; and
    wherein the display screen of the smart phone, PDA, or tablet computer is configured to display the warning signals.

2. The portable electronic device according to claim 1, wherein the driving condition includes whether the bicycle is driven at an accelerating or a uniform speed, whether the bicycle turns to the left or turns to the right, or whether the bicycle brakes.

3. The portable electronic device according to claim 1, wherein the three predefined axes are respectively represented by Z-axis in a gravity direction, X-axis perpendicular to the display screen of the electronic device, and Y-axis perpendicular to both the Z-axis and the X-axis.

4. The portable electronic device according to claim 3, wherein the determination module further:
    determines that the bicycle is driven at an accelerating or an uniform speed if the acceleration of the portable electronic device is zero or the acceleration of the portable electronic device is in a positive direction of the X-axis;
    determines that the bicycle brakes if the acceleration of the portable electronic device turns to a negative direction of the X-axis in a predefined short time period;
    determines that the bicycle turns to the left if the angular velocity of the portable electronic device around the Z-axis is in a counter-clockwise direction from the top down and the angular velocity reaches a predefined threshold value; and
    determines that the bicycle turns to the right if the angular velocity of the electronic device around the Z-axis is in a clockwise direction from the top down and the angular velocity reaches the above predefined threshold.

5. The portable electronic device according to claim 3, wherein the determination module further:
    determines that the bicycle turns to the left if the angular velocity of the portable electronic device in the counter clockwise direction around the Z-axis from the top down reaches the above predefined threshold value, an angle the portable electronic device rotates around the Z-axis from the top down is less than a first predefined value and more than a second predefined value, and the acceleration of the portable electronic device is in the positive direction of the X-axis; and
    determines that the bicycle turns to the right if the angular velocity in the counter clockwise direction around the Z-axis reaches the above predefined threshold value from the top down, an angle the portable electronic device rotates around the Z-axis is less than a first predefined value and more than a second predefined value, and the acceleration of the portable electronic device is the negative direction of the X-axis.

6. A method for displaying warning signals of a bicycle using a portable electronic device configured to be carried by the bicycle, the method comprising:
    detecting an acceleration of the portable electronic device on three predefined axes in real time using a gravity sensor of the portable electronic device, and detecting an angular velocity of the portable electronic device around the three predefined axes using a gyroscope of the portable electronic device, wherein the portable electronic device is carried by the bicycle;
    determining a current driving condition of the bicycle according to the detected acceleration and the detected angular velocity of the portable electronic device; and displaying warning signals of the bicycle on a display screen of the portable electronic device according to the current driving condition of the bicycle;

wherein the portable electronic device comprises one of a smart phone, a PDA, or a tablet computer;

wherein the smart phone, PDA, or tablet computer comprises a rigid casing and the components of the portable electronic device, including the display screen, are contained within the rigid casing;

wherein the smart phone, PDA, or tablet computer is configured to be carried on the back of a bicyclist when in use and wherein the display screen of the smart phone, PDA, or tablet computer is configured to display the warning signals.

7. The method according to claim 6, wherein the driving condition is whether the bicycle is driven at an accelerating or a uniform speed, whether the bicycle turns to the left or turns to the right, or whether the bicycle brakes.

8. The method according to claim 6, wherein the three predefined axes are respectively represented by Z-axis in a gravity direction, X-axis perpendicular to the display screen of the electronic device, and Y-axis perpendicular to both the Z-axis and the X-axis.

9. The method according to claim 8, further comprising:
determining that the bicycle is driven at an accelerating or an uniform speed if the acceleration of the portable electronic device is zero or the acceleration of the portable electronic device is in a positive direction of the X-axis;

determining that the bicycle brakes if the acceleration of the portable electronic device turns to a negative direction of the X-axis in a predefined short time period;

determining that the bicycle turns to the left if the angular velocity of the portable electronic device around the Z-axis is in a counter-clockwise direction from the top down and the angular velocity reaches a predefined threshold value; and determining that the bicycle turns to the right if the angular velocity of the portable electronic device around the Z-axis is in a clockwise direction from the top down and the angular velocity reaches the above predefined threshold.

10. The method according to claim 8, further comprising:
determining that the bicycle turns to the left if the angular velocity of the portable electronic device in the counter clockwise direction around the Z-axis from the top down reaches the above predefined threshold value, an angle the portable electronic device rotates around the Z-axis from the top down is less than a first predefined value and more than a second predefined value, and the acceleration of the portable electronic device is in the positive direction of the X-axis; and determining that the bicycle turns to the right if the angular velocity in the counter clockwise direction around the Z-axis reaches the above predefined threshold value from the top down, an angle the portable electronic device rotates around the Z-axis is less than a first predefined value and more than a second predefined value, and the acceleration of the portable electronic device is the negative direction of the X-axis.

* * * * *